F. HIBNER.
WHEEL SHOE FOR AUTOMOBILES.
APPLICATION FILED JULY 14, 1920.
1,415,444.
Patented May 9, 1922.
2 SHEETS—SHEET 1.
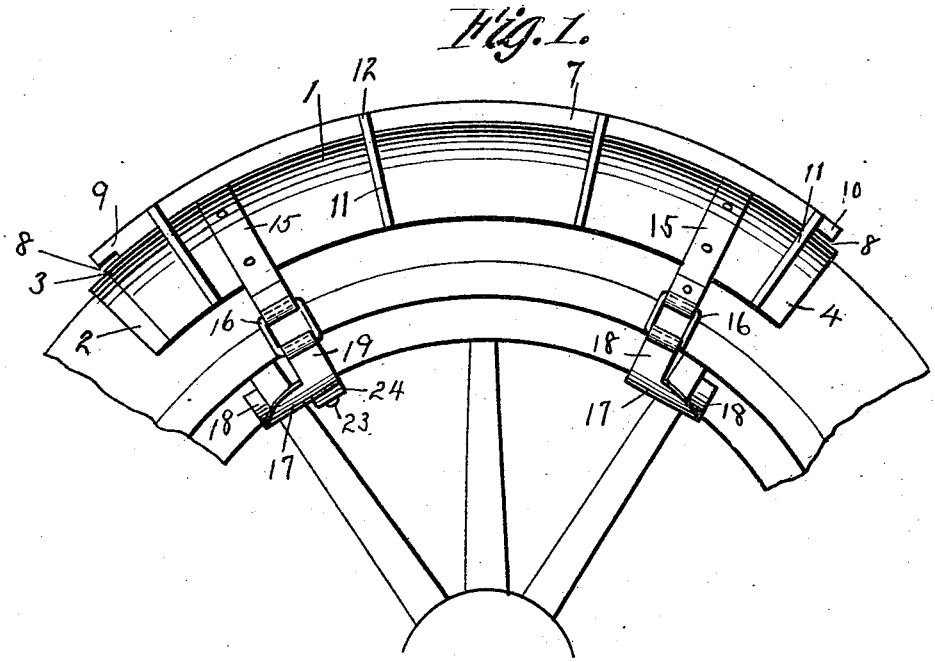
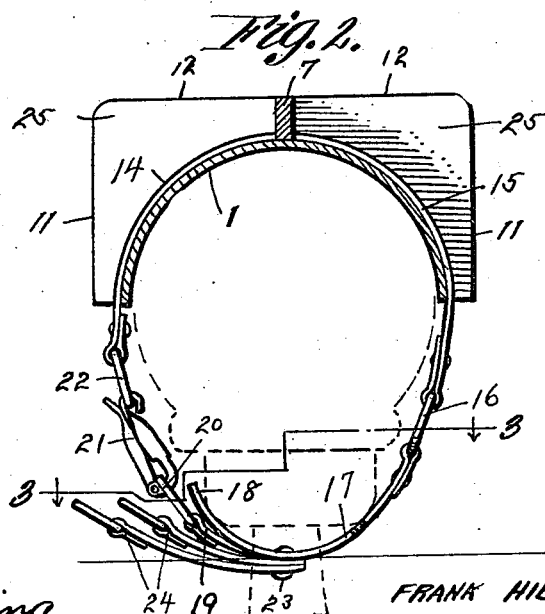
WITNESSES
Guy M. Spring
Frank D. O'Connell
INVENTOR.
FRANK HIBNER
BY
Richard B. Owen
ATTORNEY.

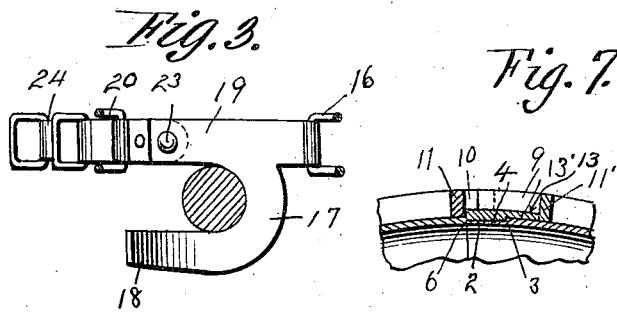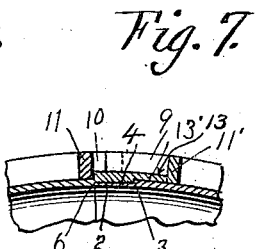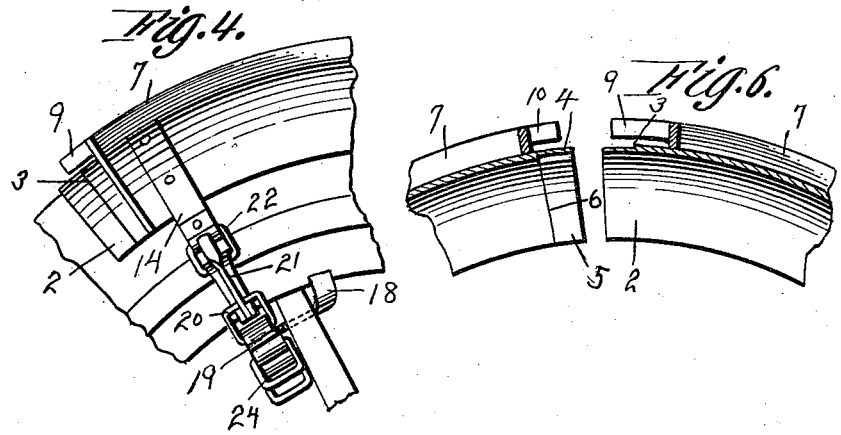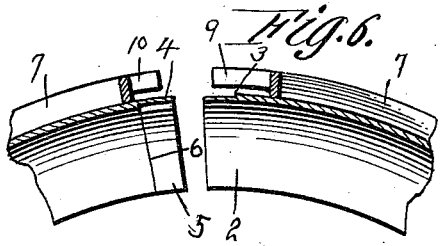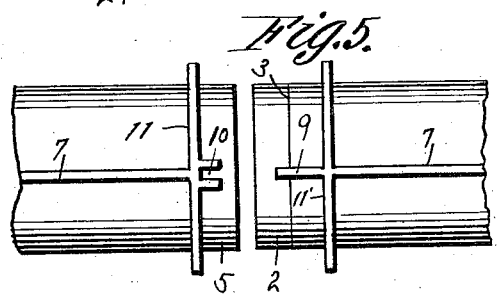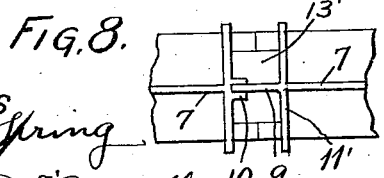

UNITED STATES PATENT OFFICE.

FRANK HIBNER, OF NORTH PLATTE, NEBRASKA.

WHEEL SHOE FOR AUTOMOBILES.

1,415,444.  Specification of Letters Patent. Patented May 9, 1922.

Application filed July 14, 1920. Serial No. 396,054.

*To all whom it may concern:*

Be it known that I, FRANK HIBNER, a citizen of the United States, residing at North Platte, in the county of Lincoln and State of Nebraska, have invented certain new and useful Improvements in Wheel Shoes for Automobiles, of which the following is a specification.

This invention has reference to tire attachments in the nature of metallic shoes or casings designed for use especially with old and worn tires as a protector or armor for preserving the tire against blow-outs or punctures, etc.

The purpose of the present invention is to provide an improved form of tire armor including a number of separable units so designed as to form, when united a continuous, endless shoe for entirely enclosing the tread portion of a tire, but capable, at the same time, of being relatively disconnected and used singly for attachment to any part of a tire as an aid in propelling the vehicle over rough or frozen ground or preventing it from becoming stalled in the ruts of soft and muddy ground.

A further and additional object is to provide a new and novel form of uniting the various sections, of a tire shoe so that they may be permitted to successively lap one another to provide a substantially solid and impenetrable armor for any tire, adjustable fastening elements of an improved character being associated with the shoe section to enable it to be conveniently attached to or detached from the vehicle wheel.

With the above and other objects in view, the invention may be said generally to reside in the details of construction, combination and arrangement of parts as will be hereinafter more fully pointed out, reference being had to the accompanying drawings, wherein, Figure 1 is a side elevation in which a fragment of an automobile wheel is illustrated with the invention applied thereto.

Figure 2 is a sectional view through the tire armor, with the tire structure shown in dotted lines to illustrate the manner of attaching the device in place.

Figure 3 is a plan view of the forked end of the fastening clamp.

Figure 4 is a detailed fragmentary view illustrating the manner in which the end of the fastener grips the edge of the tire rim.

Figure 5 is a view in plan, of fragments of adjacent shoe sections illustrating the meeting ends of the sections.

Figure 6 is a view in side elevation disclosing the slotted terminals of the raised tread or projections and Figure 7 shows the tread and ends of two sections interlocked with each other.

Figure 8 is the same as Fig. 5 assembled and showing the locking member in position.

The tire armor provided by the invention to be hereinafter described may comprise as many sections or tread plates as may appear desirable, according to the particular size of the tire with which it is designed for use and as each section is a replica of all the others it is obvious that one or more may be conveniently removed without impairing the utility of the shoe, as the remaining sections may be adjusted into closer relation and united with one another, the same as before the removal of any of the sections. All of the sections being similar, a description of one will suffice and in referring to the drawings, one of the tread plates is indicated at 1. These plates may be made from steel or other suitable material and are preferably of arcuate shape to conform to the circumference of a tire and cup-shaped in cross section to fit more snugly upon the tread portion of a tire, as illustrated to advantage in Figure 2. A lap edge 2 is formed adjacent one end of the section and extends below the level of the outer surface of the plate thus forming a shoulder 3 extending transversely of the flat edge 2 in the manner illustrated. A second lap piece 4 is formed adjacent the opposite edge of the plate by transversely grooving the under face thereof as indicated at 5, thus providing a shoulder 6 upon the inside and enabling the lap piece to be flush with the upper surface of the plate. When the various plates are arranged in place about a tire, the lap edges of each cooperate with the lap edges of adjacent ones to provide a joint between each individual section. The manner in which the joint is effected will be later explained. A raised projection or rib 7 is formed on each section, extending longitudinally of the outer face and centrally located with respect to the side edges of the plate to provide a tread or bearing surface for the shoe. The terminals of the rib are undercut as indicated at 8 to provide an open slot above each lap edge whereby the tread portions of each individual section may be relatively interlocked. The projecting terminal 9 of the said rib provides the tongue of one lock and the opposite terminal 10 provides a groove. The groove may be formed by providing a pair of tongue members in closely spaced relation to receive therebetween the tongue 9 of the succeeding plate, these tongues being made integral with the cross wing or vane 11 extending transversely of the plate at that end. A plurality of such vanes are arranged on each tread plate extending in laterally spaced relation along the sides thereof and projecting from both sides of the rib 7. These vanes have bearing edges 12 flush with the edge of the rib 7 to provide a smooth even traction surface for the armor and enabling the wheel to run smoothly and without the clattering which would occur were there no connecting tread portion between the various traction plates. To assemble the entire armor or shoe, the various sections are disposed at appropriate places about the tread of a tire and relatively arranged so that the edge 4 of one section fits upon the edge 2 of the succeeding section, the lapped edges each fitting snugly against the respective shoulders 3 and 6 and providing a joint as illustrated to advantage in Figure 7. The tongue 9, it is to be noted, fits into the groove 10 only for a short distance, the edge of the tongue being spaced from the end wall 11 of the groove a distance sufficient to allow adequate play between the sections when it is desired to separate them. When the sections are joined together, there is a closed slot or space 13 provided between the lap joint and the tongue and groove joint and when it is desired to separate the sections, the lap edge 4 of one section is raised upwardly in the space mentioned until it is above shoulder 3, subsequent to which the section may be slid inwardly until the lap 4 abuts against the wall 11′ or until the tongue 9 strikes the wall 11. This movement of the section causes its opposite end to be withdrawn from engagement with the preceding section and enables it to be eventually withdrawn from the tire, thus freeing all of the sections against movement when relatively assembled. A strap wedge, or other suitable key means 13′ may be passed through the closed slot 13 to hold the plates against displacement; the seat thus providing a key way into which any suitable locking implement 13′ could be inserted, as an auxiliary fastener. Each section is provided with a suitable number of wheel fasteners and these preferably consist of a pair of straps 14 and 15 fastened adjacent the opposite ends of a section and on two sides as illustrated. Connected to strap 15 by means of a link 16 is a forked clamp 17 designed to be hooked about a spoke of a wheel and having one prong bent upwardly at its end as indicated at 18 to more firmly hook onto the felly of the wheel. The other prong 19 carries a loop 20 designed to be engaged by a pivoted lever clasp 21 hooked to the link 22 of strap 14. Riveted to the prong 19 as indicated at 23 are a number of auxiliary loop carrying straps 24 arranged to project forwardly from beneath one another for engagement with the clasp 21 whereby the sections can be conveniently fastened to wheels and tires of different sizes. It may here be mentioned, however, that this fork-type of clamp is intended for use with wheels having spokes of unusually large cross section. The forked portion of the clamp may consequently be omitted from the construction of the fastening means when attached to armor sections designed for use in connection with automobile wheels of the usual wire-spoke construction as in such a case only a single prong 18 would be necessary and convenient for insertion between the spokes of the wheel, for engagement with the locking lever in the usual manner.

It is intended that these sections be either cast in a single piece or that the various portions be welded or otherwise formed into a solid structure. When a number of these sections are assembled in united relation about the tread of a tire, they provide a continuous impenetrable armor, shielding the tire from punctures and blow outs and preventing the vehicle from skidding since the traction plates carried by the sections provide friction surfaces having intermittent contact with the ground as the wheel continues to turn.

In their individual capacity, the various sections may be employed for variant and useful purposes and may be clamped about the blow outs in the casing and securely fastened in place after the inner tube has been patched and inserted in the casing. With the section thus applied, the tire can be very readily pumped up without danger of further rupture of the tube or casing. In using one or more of the sections as an aid in enabling a vehicle to move out of a rut in which it may have become stalled, they may be fastened at any appropriate place about the periphery of the rear wheel and as the latter revolves, the corner portions of the traction blades provide paddle ends 25 for successively engaging the soft ground and urging the vehicle forward. It will thus be seen that the center rib which runs lengthwise of the shoe at its center provides the tread or bearing surface of the shoe and that the traction blades which project on opposite sides of the shoe, with their edges flush with the tread rib not only cooperate with the latter in providing a suitable and frictional bearing surface for the shoe but also provide impelling means for shoving or urging the car ahead when stalled in a rut, etc.

It is obvious that various changes may be resorted to in the construction and arrangement of parts and it is therefore to be understood that minor changes in the details and arrangement and combination of parts and method of constructing may be resorted to as properly fall within the scope of the invention defined by the claims appended.

Having thus fully described my invention what I claim as new and desire to secure by Letters Patent is:—

1. A sectional tire armor having the sections provided each with a tread forming rib undercut at each end and terminating in a tongue and groove respectively whereby the sections may be relatively interlocked with the undercut portions of the rib providing a slot below each interlocking joint into which any suitable key means may be inserted for holding the sections in place.

2. A sectional tire armor having sections designed to successively overlap one another and provided each with a tread forming rib having a tongue at one end and a groove at the other end for respectively interlocking with the groove and tongue of adjacent sections, said rib being undercut at each end to allow for the engagement or disengagement of the lapped edges of the interlocking sections.

3. A tire armor comprising sections having their meeting edges grooved to provide a lapped joint between each section and ribbed uniformly to provide a continuous tread, undercut above each joint to permit the sections to be relatively adjusted, and auxiliary traction means formed on each side of the continuous tread.

In testimony whereof I affix my signature in presence of two witnesses.

FRANK HIBNER.

Witnesses:
W. H. MUNGER,
MAURICE WILLIAMS.